(12) United States Patent
Dong

(10) Patent No.: US 12,132,335 B2
(45) Date of Patent: Oct. 29, 2024

(54) CHARGING METHOD AND DEVICE, AND DEVICE

(71) Applicant: BEIJING XIAOMI MOBILE SOFTWARE CO., LTD., Beijing (CN)

(72) Inventor: Kai Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 632 days.

(21) Appl. No.: 17/362,733

(22) Filed: Jun. 29, 2021

(65) Prior Publication Data

US 2022/0247198 A1 Aug. 4, 2022

(30) Foreign Application Priority Data

Feb. 2, 2021 (CN) .......................... 202110145988.0

(51) Int. Cl.
*H02J 7/00* (2006.01)

(52) U.S. Cl.
CPC ........ *H02J 7/00308* (2020.01); *H02J 7/0047* (2013.01)

(58) Field of Classification Search
USPC .......................................................... 320/137
See application file for complete search history.

(56) References Cited

U.S. PATENT DOCUMENTS

| | | | | |
|---|---|---|---|---|
| 5,130,634 A | * | 7/1992 | Kasai | ................ H02J 7/007182 320/160 |
| 2005/0045225 A1 | | 3/2005 | Sekine | |
| 2014/0340041 A1 | | 11/2014 | Aggeler et al. | |
| 2014/0347003 A1 | * | 11/2014 | Sporck | .................... H02J 1/102 320/107 |
| 2016/0276844 A1 | | 9/2016 | Geknozu | |
| 2017/0346327 A1 | * | 11/2017 | Chen | ..................... H02J 7/0045 |
| 2018/0269697 A1 | * | 9/2018 | Zhang | ............... H02J 7/007182 |
| 2019/0207415 A1 | | 7/2019 | Wu | |

FOREIGN PATENT DOCUMENTS

| | | | | | |
|---|---|---|---|---|---|
| CN | 203674751 U | * | 6/2014 | | |
| CN | 104659884 A | * | 5/2015 | ........ | H01M 10/4207 |
| CN | 105529816 A | | 4/2016 | | |
| CN | 107947330 A | | 4/2018 | | |

(Continued)

OTHER PUBLICATIONS

European Search Report in the European application No. 21182462.8, mailed on Dec. 15, 2021,(8p).

*Primary Examiner* — Samuel Berhanu
(74) *Attorney, Agent, or Firm* — Arch & Lake LLP; Hao Tan; Zhangyuan Ji

(57) ABSTRACT

A charging device, method, and device are provided. The charging device may include a charging circuit that may include at least a first charging module and a second charging module. The charging device may include a switching circuit that may connect the first charging module and the second charging module. The switching circuit may control, in response to normal charging with the first charging module, the first charging module to enter a charging state or may control both the second charging module and the first charging module to enter the charging state, or may control, in response to abnormal charging with the first charging module, the second charging module to enter the charging state.

15 Claims, 12 Drawing Sheets

(56) References Cited

FOREIGN PATENT DOCUMENTS

| | | |
|---|---|---|
| CN | 207638392 U | 7/2018 |
| CN | 111546944 A | 8/2020 |
| CN | 211266581 U | 8/2020 |
| EP | 2624400 A1 | 8/2013 |
| EP | 3506457 A1 | 7/2019 |
| EP | 3754807 A1 | 12/2020 |
| JP | H06327168 A | 11/1994 |
| KR | 20090082809 A | 7/2009 |

* cited by examiner

CHARGING METHOD AND DEVICE, AND DEVICE

CROSS-REFERENCE TO RELATED APPLICATION

This application is based on and claims benefit of priority to Chinese Application No. 202110145988.0, filed on Feb. 2, 2021, the disclosure of which is hereby incorporated by reference in its entirety for all purposes.

TECHNICAL FIELD

The present disclosure relates, but is not limited, to the field of charging technology, and more particularly, to a charging method and device, and a device.

BACKGROUND

In related art, electronic equipment such as a mobile phone, a tablet computer, etc., supports charging at a high power (e.g., greater than 30 W), which requires an increasingly high charging speed. However, a fault of slow charging often occurs at present. For example, when a charging architecture including a Power Management Integrated Circuit (PMIC) charging chip and a dual charging chip (a master charger and a slave charger) is used, when an abnormality occurs in the master charger in the dual charging chip, it is impossible to continue charging by switching to the slave charger (slave charger). It is only possible to perform charging by switching to the PMIC charger. However, the charging power supported by the PMIC charger per se is not high, lowering the charging speed of the electronic equipment greatly, bringing a poor user experience.

SUMMARY

The present disclosure provides a charging method and device, and a device.

According to a first aspect of the present disclosure, there is provided a charging device. The charging device may include a charging circuit that may include at least a first charging module and a second charging module. The charging device may include a switching circuit connecting the first charging module and the second charging module. The switching circuit may control, in response to normal charging with the first charging module, the first charging module to enter a charging state or control both the second charging module and the first charging module to enter the charging state, or may control, in response to abnormal charging with the first charging module, may control the second charging module to enter the charging state.

According to a second aspect of the present disclosure, there is provided a charging method. The charging method may be applied to a charging device. The charging device may acquire charging information according to the first charging module. The charging device may include a charging circuit. The charging circuit may include at least a first charging module and a second charging module. The charging device may switch to charging according to the second charging module in response to the charging information indicating abnormal charging with the first charging module.

According to a third aspect of the present disclosure, there is provided a device. The device may include one or more processors, a non-transitory computer-readable memory storing instructions executable by the one or more processors. The one or more processors may be configured to acquire charging information according to a first charging module, wherein a charging device comprises a charging circuit, the charging circuit comprising at least the first charging module and a second charging module, the device. The one or more processors may further be configured to switch to charging according to the second charging module in response to the charging information indicating abnormal charging with the first charging module.

It should be understood that the general description above and the detailed description below are illustrative and explanatory only, and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
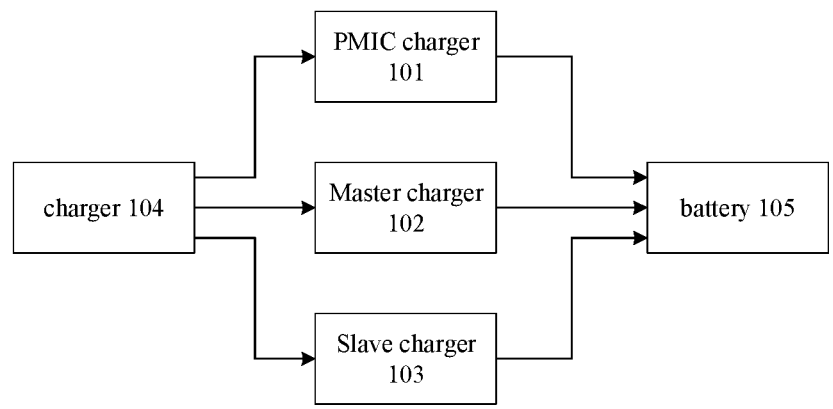
FIG. 1 is a block diagram of a charging device, according to an example of the present disclosure.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with aspects related to the present disclosure as recited in the appended claims. The illustrative implementation modes may take on multiple forms, and should not be taken as being limited to examples illustrated herein. Instead, by providing such implementation modes, embodiments herein may become more comprehensive and complete, and comprehensive concept of the illustrative implementation modes may be delivered to those skilled in the art. Implementations set forth in the following illustrative embodiments do not represent all implementations in accordance with the present disclosure. Rather, they are merely examples of the apparatus and method in accordance with certain aspects herein as recited in the accompanying claims.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical improvements of the embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A device may be a terminal. A terminal may sometimes be referred to as a smart terminal. The terminal may be a mobile terminal. The terminal may also be referred to as User Equipment (UE), a Mobile Station (MS), etc. A terminal may be equipment or a chip provided therein that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

As shown in FIG. 1, a charging architecture is disclosed. The charging architecture includes a PMIC charging chip 101 and a master-slave charging chip. The master-slave charging chip includes a master charger 102 and a slave charger 103. The master charger 102, the slave charger 103, and the PMIC charging chip 101 are connected in parallel between a charger 104 and a battery 105. Here, the charging power per unit time of the PMIC charging chip 101 is less than charging efficiency per unit time of the master charger 102 or the slave charger 103. During charging, the battery 105 may be charged by the master-slave charging chip during a Constant Current (CC) charging phase. During a Constant Voltage (CV) charging phase, the battery 105 may be charged by the PMIC charging chip 101.

Because of the fixed peripheral configuration circuit of the master-slave charging chip, when the master charger 102 stops operating, the slave charger 103 also stops operating. In the CC charging phase, in case of abnormal charging caused by the master charger 102 being damaged, etc., both the master charger 102 and the slave charger 103 have to stop operating at the same time. In this case, if charging is performed by switching to the PMIC charging chip 101, the charging power may be low, leading to slow charging.

In embodiments of the present disclosure, there is provided a charging device. With the charging device, in case of abnormal charging with a first charging module (such as a master charger), a second charging module (such as a slave charger) automatically enters a charging state to perform charging, so that the charging device can also perform charging based on one charging module, thereby increasing a charging speed.

Figure 2:
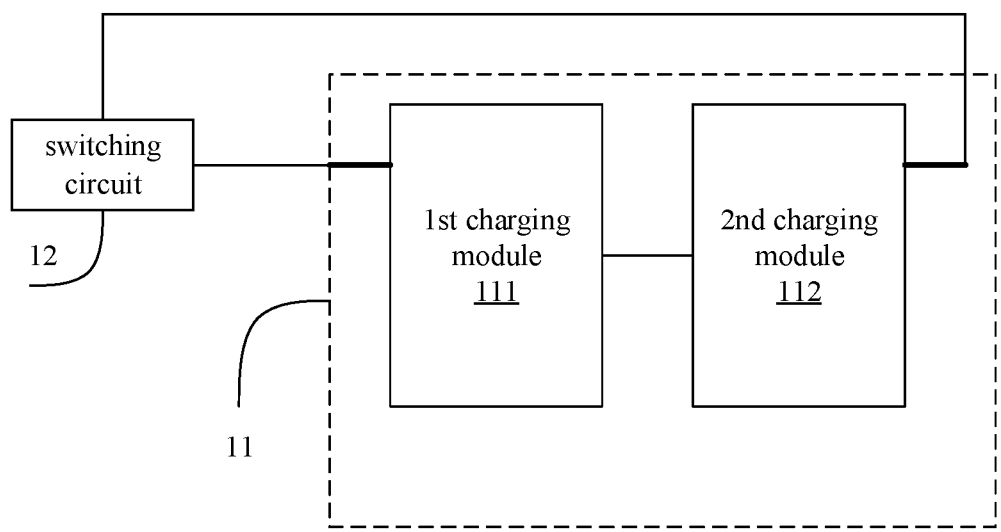
FIG. 2 is a block diagram of a charging device, according to an example of the present disclosure.

FIG. 2 is a block diagram of a charging device according to an illustrative embodiment. As shown in FIG. 2, the charging device includes a charging circuit and a switching circuit.

The charging circuit 11 includes N charging modules. The N charging modules include at least a first charging module 111 and a second charging module 112. The N is an integer greater than 1. The charging modules may be charging circuits or charging chips of any type or a module having a charging function.

The switching circuit 12 connects the first charging module 111 and the second charging module 112.

The switching circuit 12 is configured to, in response to normal charging with the first charging module 111, control the first charging module 111 to enter a charging state or control both the second charging module 112 and the first charging module 111 to enter the charging state; or, in response to abnormal charging with the first charging module 111, control the second charging module 112 to enter the charging state.

The charging device described in embodiments of the present disclosure may be applied to a terminal. The terminal may be a mobile terminal or a fixed terminal. For example, the terminal may be a mobile phone, a computer, a notebook, a wireless charging receiving end, a transmitting end, etc.

In embodiments of the present disclosure, each of the first charging module and the second charging module may be a charging chip of any type or a module having a charging function. The first charging module and the second charging module may be of the same type or of different types.

In one or more embodiments, the first charging module may be a master charging module, and the second charging module may be a slave charging module.

Figure 3:
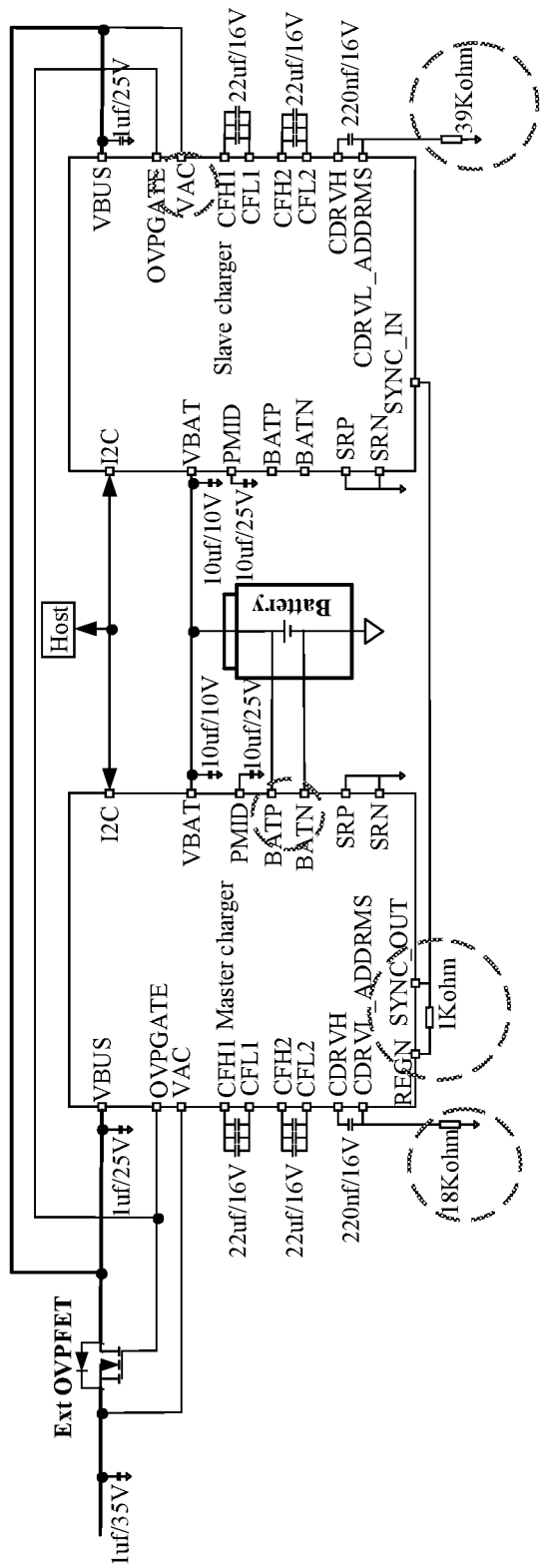
FIG. 3 is a block diagram of a charging device, according to an example of the present disclosure.

As shown in FIG. 3, in another embodiment, the first charging module may be a master charger, and the second charging module may be a slave charger.

In one or more embodiments, the switching circuit is configured to control the second charging module to perform charging and control the first charging module to stop performing charging in response to abnormal charging with the first charging module.

In some embodiments, the N charging modules may also be three or more charging modules. In case of abnormal charging with one of the charging modules, at least one of the other N−1 charging modules may enter the charging state. Thus, in the present embodiment, in case of abnormal charging with one of the N charging modules, charging may be performed using one or more of the other N−1 charging modules, maintaining continuous charging by the wireless charging device, improving charging efficiency.

For example, there is 1 first charging module and 1 second charging module. As another example, there are 1 first charging module and multiple second charging modules. As another example, there are a plurality of first charging modules and 1 second charging module. As another example, there are a plurality of first charging modules and a plurality of second charging modules. Here, a first charging module corresponds to a second charging module, or a first charging module corresponds to a plurality of second charging modules.

In embodiments of the present disclosure, in case of normal charging with the first charging module, the first charging module may be controlled to enter the charging state, or both the second charging module and the first charging module may be controlled to enter the charging state. That is, the second charging module is a slave charging module of the first charging module, and in case of normal charging with the first charging module, the second charging module may perform charging according to the first charging module or the first charging module may perform charging by itself. In addition, in case of abnormal charging with the first charging module, the second charging module may be controlled to perform charging. That is, when charging cannot be performed using the first charging module, charging may be performed according to the second charging module.

In this way, with embodiments of the present disclosure, in case of abnormal charging with the first charging module, the second charging module may replace the first charging module as a second master charging module to perform charging, thereby preventing low charging efficiency of the charging device and slow charging caused by that the second charging module stops operating due to abnormal charging with the first charging module, improving charging efficiency greatly, reducing charging time.

Figure 4:
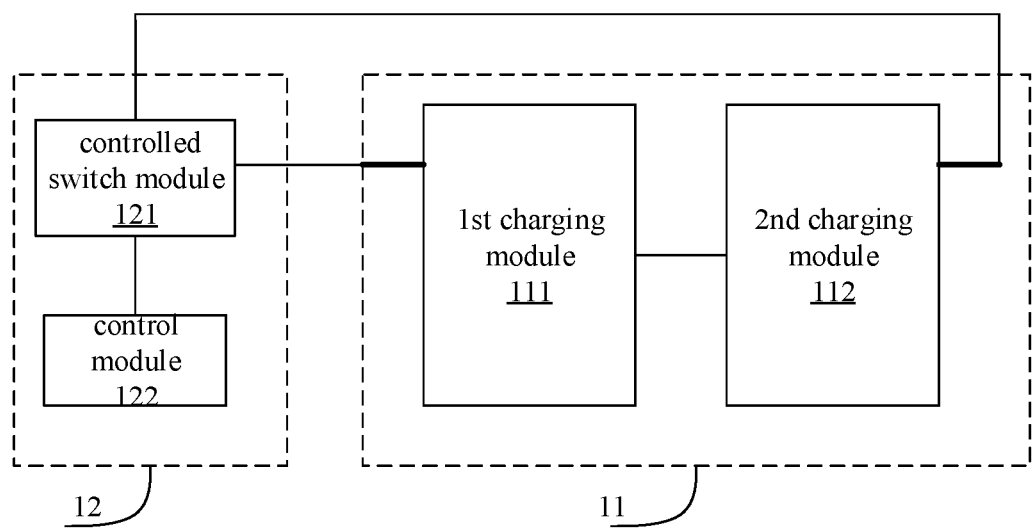
FIG. 4 is a block diagram of a charging device, according to an example of the present disclosure.

As shown in FIG. 4, the switching circuit 12 may include a controlled switch module and a control module.

The controlled switch module 121 may connect the first charging module 111 and the second charging module 112.

The control module 122 may be connected to the controlled switch module 121, and configured to, in response to abnormal charging with the first charging module 111, switch the controlled switch module 121 from a first switch state to a second switch state, causing the second charging module 112 to enter the charging state.

If the controlled switch module 121 is in the first switch state, and normal charging occurs with the first charging module 111, the second charging module 112 may enter a non-charging state.

In one or more embodiments, the controlled switch module is in the first switch state when abnormal charging with the first charging module occurs. When receiving the first control signal, the control module of the switching circuit switches the switch state of the controlled switch module to the second switch state.

The control module 122 here generally controls overall operation of the charging device, such as connection switching between ends of the controlled switch module. The control module may be a module including one or more processing chips or processors. Alternatively, the control module may be a control circuit capable of processing a signal. The control circuit may include a control chip or a controller, etc.

The control signal transmitted by the control module here may be a high level signal or a low level signal. For example, the first control signal transmitted is a high level signal, or the second control signal transmitted is a low level signal. The high level signal and the low level signal are with respect to each other.

In embodiments of the present disclosure, the switch state of the controlled switch module may be switched via the switching circuit, so that in case of abnormal charging with the first charging module, the second charging module that originally cannot perform charging may be allowed to perform charging for the wireless charging device, thereby enabling the wireless charging device to perform charging according to the second charging module, improving charging efficiency of the wireless charging device, reducing charging time.

Of course, in other embodiments, the control module may also switch the switch state of the controlled switch module to the first switch state based on a second control signal.

Figure 5:
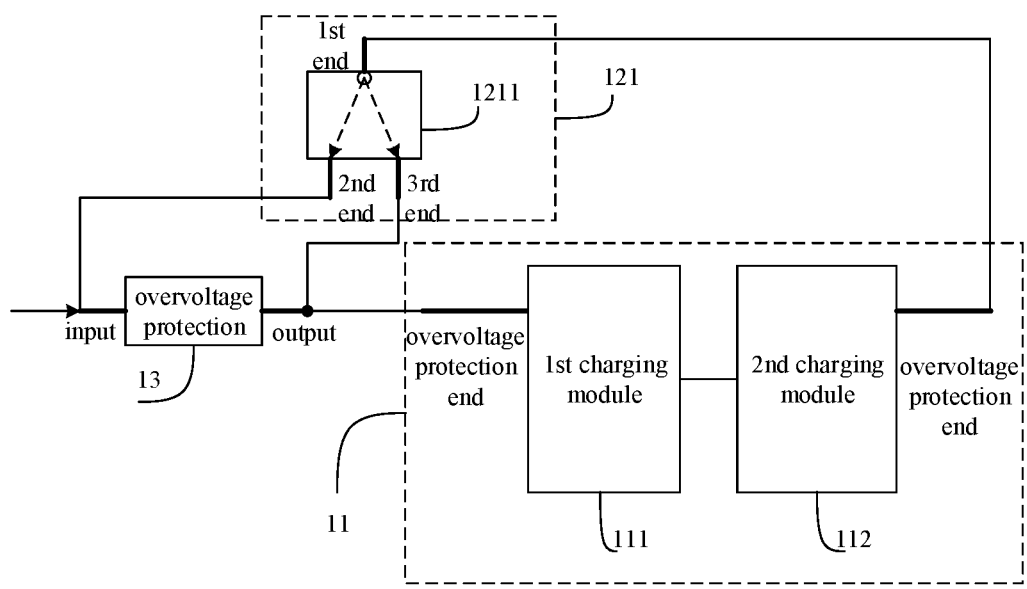
FIG. 5 is a block diagram of a charging device, according to an example of the present disclosure.

As shown in FIG. 5, the charging device may further include an overvoltage protection circuit 13.

The controlled switch module 121 may include a first controlled switch 1211.

An overvoltage protection end of the first charging module 111 may be connected to an input end of the overvoltage protection circuit 13.

An overvoltage protection end of the second charging module 112 may be connected to a first end of the first controlled switch 1211. A second end of the first controlled switch 1211 may be connected to an input end of the overvoltage protection circuit 13. A third end of the first controlled switch 1211 may be connected to an output end of the overvoltage protection circuit 13.

When abnormal charging with the first charging module 111 occurs, the second end and the first end of the first controlled switch 1211 may be connected, and the second charging module 112 may enter the charging state.

In one or more embodiments, the controlled switch module being in a second switch state includes at least that a first end and a second end of the first controlled switch is connected.

In one or more embodiments, when the overvoltage protection end of the first charging module is connected to the input end of the overvoltage protection circuit and the overvoltage protection end of the second charging module is connected to the output end of the overvoltage protection circuit, the first charging module is a master charging module and the second charging module is a slave charging module.

The overvoltage protection circuit here serves to stabilize the input voltage value to output voltage in a predetermined range.

In one or more embodiments, as shown in FIG. 3, the overvoltage protection circuit includes a metal oxide semiconductor field effect (MOS) transistor and a diode. An anode of the diode is connected to a drain of the MOS transistor. A cathode of the diode is connected to a source of the MOS transistor. The source of the MOS transistor is an input end of the overvoltage protection circuit. The drain of the MOS transistor is an output end of the overvoltage protection circuit. When the output voltage of the overvoltage protection circuit is higher than a predetermined value, the diode is turned on, and the output voltage is clamped so that the output voltage is limited to a predetermined range. Of course, in other embodiments, the overvoltage protection circuit may be of any circuit form, provided that the input voltage is stabilized to output voltage within a predetermined range. A component included in the overvoltage protection circuit and a mode of connection thereof is not limited herein.

In an application scene, the input end of the overvoltage protection circuit is the front stage of the overvoltage protection circuit, and the output end of the overvoltage protection circuit is the rear stage of the overvoltage protection circuit.

The overvoltage protection end here is configured for overvoltage protection of the input voltage of the first charging module or the second charging module. In one or more embodiments, as shown in FIG. 3, the overvoltage protection end is a VAC pin of a charging chip. The VAC pin is configured to detect the magnitude of the AC input.

Here, the first controlled switch is a single pole double throw switch. The first controlled switch may include at least three ends. Of course, in other embodiments, the first controlled switch may be of another switch type, provided that it is possible to switch between the input end or the output end of the overvoltage protection circuit.

Here, the second charging module enters the charging state. That is, the second charging module charges a connected battery.

Here, the overvoltage protection end of the second charging module is connected to the first end of the first controlled switch, the second end of the first controlled switch is connected to the input end of the overvoltage protection circuit, and the third end of the first controlled switch is connected to the output end of the overvoltage protection circuit. Then, when the first end and the second end of the first controlled switch are connected, the overvoltage protection end of the second charging module and the input end of the overvoltage protection circuit are connected; when the first end and the third end of the first controlled switch are connected, the overvoltage protection end of the second charging module and the output of the overvoltage protection circuit are connected.

In related art, as shown in FIG. 3, if the second charging module is connected directly to the output end of the overvoltage protection circuit, the second charging module may stop operating in case of abnormal charging with the first charging module, thereby reducing charging efficiency greatly.

In embodiments of the present disclosure, in case of abnormal charging with the first charging module, the first end and the second end of the first controlled switch are connected to each other, and the overvoltage protection end of the second charging module and the input end of the overvoltage protection circuit are connected, so that the second charging module replaces the first charging module to perform charging, thereby preventing low charging efficiency of the charging device and slow charging caused by that the second charging module stops operating due to abnormal charging with the first charging module in related art, improving charging efficiency greatly, reducing charging time.

In some embodiments, when the first charging module performs charging normally, the first end and the third end of the first controlled switch are connected, and the second charging module enters a non-charged state. The controlled switch module here is in the second switch state.

Here, the first end and the third end of the first controlled switch are connected. That is, the overvoltage protection end of the second charging module and the output end of the overvoltage protection circuit are connected. In this case, a connected battery is charged mainly using the first charging module in the charging circuit.

Thus, in embodiments of the present disclosure, the first charging module or the second charging module may be selected freely to perform charging according to whether abnormal charging with the first charging module occurs. For example, in case of abnormal charging with the first charging module, the charging circuit may switch to charging using the second charging module. As another example, in case of normal charging with the first charging module, the charging circuit may switch to charging using the first charging module. In this way, charging efficiency of the charging device may be substantially maintained when charging abnormality such as damage or communication abnormality occurs to one of the first charging module and the second charging module in the charging circuit.

In other embodiments, in case of normal charging with the first charging module, the first end and the third end of the first controlled switch are connected, and the second charging module maintains the charging state. Here, if no abnormal charging with the first charging module occurs, and no damage occurs to the second charging module, the second charging module may still be used to perform charging, although charging power of the second charging module is determined based on charging power of the first charging module.

For example, in one or more embodiments, in case of normal charging with the first charging module, the first end and the third end of the first controlled switch are connected, and the second charging module maintains the charging state but charging power of the second charging module is reduced. In this case, as shown in FIG. 3, a synchronization signal output end (e.g., a SYNC_OUT pin) of the first charging module is connected to a synchronization signal input end (e.g., a SYNC_IN pin) of the second charging module.

Here, the charging information of the first charging module may be transmitted to the second charging module based on the connection between the synchronization signal output end and the synchronization signal input end. Thus, the present example may inform the second charging module of the current charging power or the charging state of the first charging module.

For example, the charging information may be a high level signal or a low level signal. The high level signal is configured to indicate normal charging with the first charging module. The low level signal is configured to indicate abnormal charging with the first charging module. Here, the high level is with respect to the low level. Voltage of the high level is higher than voltage of the low level.

As another example, the charging information may be a signal of a predetermined level signal. The signal of the predetermined level signal is configured to indicate charging power of the first charging module.

Figure 6A:
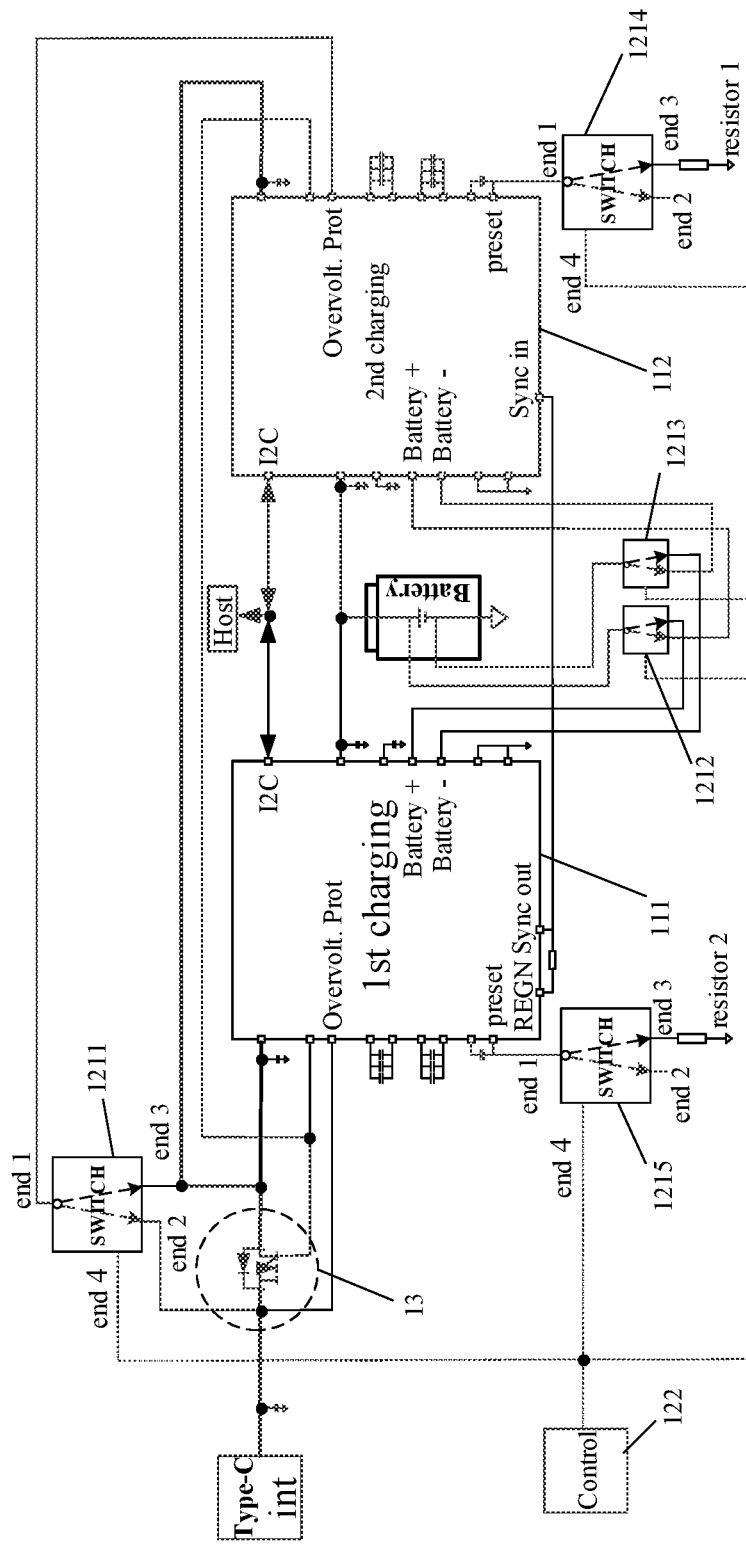
FIG. 6A is a block diagram of a charging device, according to an example of the present disclosure.
Figure 6B:
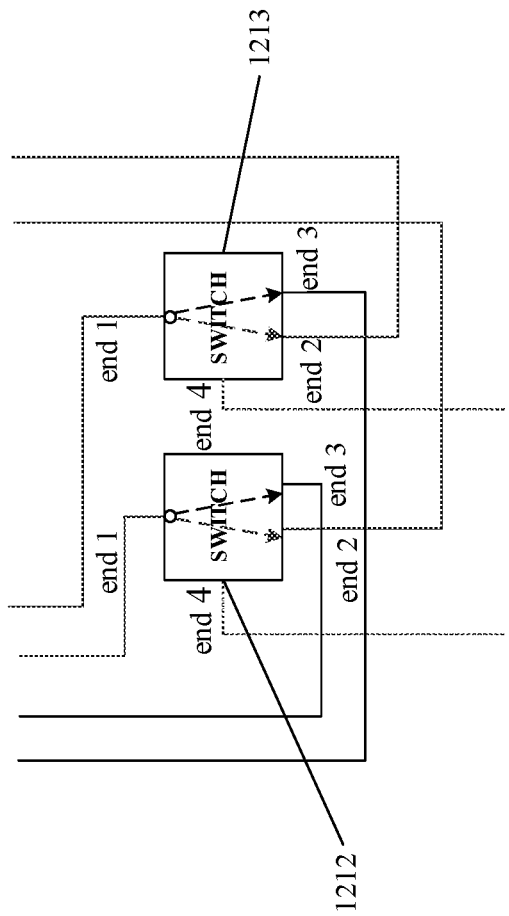
FIG. 6B is a partial view of a lower middle part of the charging device in FIG. 6A.

In some embodiments, as shown in FIG. 6A and FIG. 6B, the controlled switch module 121 may further include a second controlled switch 1212 and a third controlled switch 1213.

A first end of the second controlled switch 1212 may be configured to be connected to a positive pole of a battery. A second end of the second controlled switch 1212 may be configured to be connected to a battery positive pole end of the second charging module 112. A third end of the second controlled switch 1212 may be configured to be connected to a battery positive pole end of the first charging module 111.

A first end of the third controlled switch 1213 may be configured to be connected to a negative pole of the battery. A second end of the third controlled switch 1213 may be configured to be connected to a battery negative pole end of the second charging module 112. A third end of the third controlled switch 1213 may be configured to be connected to a battery negative pole end of the first charging module 111.

When abnormal charging with the first charging module 111 occurs, the second end and the first end of the second controlled switch 1212 may be connected, the second end and the first end of the third controlled switch 1213 may be connected, and the second charging module 112 may detect a charging voltage of the battery.

In one or more embodiments, the controlled switch module being in the second switch state includes at least that the first end and the second end of the second controlled switch are connected, and that the first end and the second end of the third controlled switch are connected.

Each of the second controlled switch and the third controlled switch here may be a single pole double throw switch. Each of the second controlled switch and the third controlled switch may include at least three ends. Of course, in other embodiments, the second controlled switch and the third controlled switch may be of other switch types, provided that the second controlled switch may be switched between the battery positive pole end of the first switch module and the battery positive pole end of the second switch module, and that the third controlled switch may be switched between the battery negative pole end of the first switch module and the battery negative pole end of the second switch module.

Here, the battery positive pole end and the battery negative pole end are configured for detecting the charging voltage of the battery. In one or more embodiments, as shown in FIG. 3 or FIG. 6A and FIG. 6B, the battery positive pole end is a BATP pin of the charging chip, and the battery negative pole end is a BATN pin of the charging chip.

The battery here may be a battery of the first charging module or the second charging module. The first charging module or the second charging module may be connected to the battery based on VBAT pins. In a practical application, the first charging module enters the charging state, that is, the first charging module charges the battery. The second charging module enters the charging state, that is, the second charging module charges the battery.

Here, the second end and the first end of the second controlled switch are connected, and the second end and the first end of the third controlled switch are connected. That is, the battery positive pole end of the second charging module and the positive pole of the battery are connected, and the battery negative pole end of the second charging module and the negative pole of the battery are connected. Then, the second switch module may be configured to detect the charging voltage of the battery.

In embodiments of the present disclosure, in case of abnormal charging with the first charging module, the second end and the first end of the second controlled switch may be connected, and the second end and the first end of the third controlled switch may be connected, so that the second switch module may detect the charging voltage of the battery, thereby improving safety in charging the battery by the second charging module, etc.

In other embodiments, if the first charging module performs charging normally, the first end and the third end of the second controlled switch are connected, the first end and the third end of the third controlled switch are connected, and the first charging module detects the charging voltage of the battery.

The first end and the third end of the second controlled switch are connected, and the first end and the third end of the third controlled switch are connected. That is, the battery positive pole end of the first charging module and the positive pole of the battery are connected, and the battery negative pole end of the first charging module and the negative pole of the battery are connected. Then, the first switch module may be configured to detect the charging voltage of the battery.

In embodiments of the present disclosure, in case of normal charging with the first charging module, the first end and the third end of the second controlled switch are connected, and the first end and the third end of the third controlled switch are connected, so that the first charging module may detect the charging voltage of the battery, thereby improving safety in charging the battery by the first charging module.

Referring again to FIG. 6A and FIG. 6B, in some embodiments, the controlled switch module 121 may further include a fourth controlled switch 1214 and a fifth controlled switch 1215.

A first end of the fourth controlled switch 1214 may be connected to the second charging module 112. A second end of the fourth controlled switch 1214 may suspend. A third end of the fourth controlled switch 1214 may be configured to be connected to a first resistor.

A first end of the fifth controlled switch 1215 may be connected to the first charging module 1111. A second end of the fifth controlled switch 1215 may suspend.

When abnormal charging with the first charging module 111 occurs, the second end and the first end of the fourth controlled switch 1214 may be connected, and the second end and the first end of the fifth controlled switch 1215 may be connected; or the third end and the first end of the fourth controlled switch 1214 may be connected, and the second end and the first end of the fifth controlled switch 1215 may be connected.

In one or more embodiments, the controlled switch module being in the second switch state includes at least the follows.

The second end and the first end of the fourth controlled switch are connected, and the second end and the first end of the fifth controlled switch are connected. Alternatively, the third end and the first end of the fourth controlled switch are connected, and the second end and the first end of the fifth controlled switch are connected.

The first end of the fourth controlled switch 1214 is connected to the second charging module 112, that is, the first end of the fourth switch 1214 is connected to a predetermined end of the second charging module 112. The predetermined end of the second charging module may be configured to configure different I2C addresses of the second charging module when resistors having different resistances are connected to the predetermined end of the second charging module. Here, An I2C address may be configured to identify whether the second charging module is a master charging module or a slave charging module.

Here, the first end of the fifth controlled switch 1215 is connected to the first charging module 111, that is, the first end of the fifth controlled switch 1215 is connected to a predetermined end of the first charging module 111. The predetermined end of the first charging module may be configured to configure different I2C addresses of the first charging module when resistors having different resistances are connected to the predetermined end of the first charging module. Here, an I2C address may be configured to identify whether the first charging module is a master charging module or a slave charging module.

In one or more embodiments, as shown in FIG. 3, the predetermined end is a CDRVL_ADDRMS of the charging chip.

Here, the second end and the first end of the fourth controlled switch are connected, and the second end and the first end of the fifth controlled switch are connected, that is, the predetermined end of the second charging module suspends and the predetermined end of the first charging module suspends. Thus, the charging device is in a state of charging with a single charging module. The single charging module is the only charging module of all charging modules in the charging device used to perform charging. In this example, charging with the single charging module is charging according to the second charging module.

Here, the third end and the first end of the fourth controlled switch are connected, and the second end and the first end of the fifth controlled switch are connected, that is, a predetermined end of the second charging module is connected to the first resistor and a predetermined end of the first charging module suspends. Thus, the charging device is in a state of charging with a single charging module, i.e., the second charging module. Here, the first resistor is configured to configure the I2C address of the second charging module as the master charging module.

In embodiments of the present disclosure, the charging device may be configured to be in a state of charging with a single charging module by suspending predetermined ends of the first charging module and the second charging module. Alternatively, a state of charging with a single charging module of the second charging module is determined by suspending the first charging module and connecting a first resistor of a predetermined impedance to the second charging module, thereby implementing a peripheral configuration of switching to the second charging module as the master charging module when abnormal charging with the first charging module occurs.

Of course, in other embodiments, the charging device further includes a second resistor.

The third end of the fifth controlled switch may be connected to the second resistor.

When normal charging with the first charging module occurs, the third end and the first end of the fourth controlled switch are connected, and the first end and the third end of the fifth controlled switch are connected.

Alternatively, when normal charging with the first charging module occurs, the second end and the first end of the fourth controlled switch are connected, and the second end and the first end of the fifth controlled switch are connected.

Alternatively, when normal charging with the first charging module occurs, the second end and the first end of the fourth controlled switch are connected, and the first end and the third end of the fifth controlled switch are connected.

Here, the third end and the first end of the fourth controlled switch are connected, and the first end and the third end of the fifth controlled switch are connected, that is, the predetermined end of the second charging module is connected to the first resistor and the predetermined end of the first charging module is connected to the second resistor. Thus, in the present example, the first charging module and the second charging module are used together for charging. The first charging module may be the master charging module, and the second charging module may be the slave charging module. Here, the predetermined end of the first charging module is connected to the second resistor for configuring the first charging module as the master charging module, and the predetermined end of the second charging module is connected to the first resistor for configuring the second charging module as the slave charging module.

Here, the second end and the first end of the fourth controlled switch are connected, and the second end and the first end of the fifth controlled switch are connected, that is, the predetermined end of the second charging module suspends and the predetermined end of the first charging module suspends. Thus, the charging device is in a state of charging with a single charging module. In this example, charging with the single charging mode is charging according to the first charging module.

Here, the second end and the first end of the fourth controlled switch are connected, and the first end and the third end of the fifth controlled switch are connected, i.e., the predetermined end of the second charging module suspends and the predetermined end of the first charging module is connected to the second resistor. As such, the charging device is in a state of charging with a single charging module of the first charging module. Here, the second resistor is configured to configure the I2C address of the first charging module as the master charging module.

Here, the resistance of the first resistor may differ from the resistance of the second resistor. For example, as shown in FIG. 3, the first resistor has a resistance of 39 KΩ and the second resistor has a resistance of 18 KΩ.

In this way, in embodiments of the present disclosure, in case of normal charging with the first charging module, configuration of diversified charging may be implemented by different configurations of predetermined ends of the first charging module and the second charging module. For example, it is determined whether charging is performed using only the first charging module or using both the first charging module and the second charging module by determining whether the predetermined ends of the first charging module and the second charging module suspend. As another example, identities of the master charging module and the slave charging module are determined when both the first charging module and the second charging module are used for charging by connection of different resistors to predetermined ends of the first charging module and the second charging module.

Referring again to FIG. 7A and FIG. 7B, in some embodiments, the synchronization signal output of the first charging module 111 is connected to the synchronization signal input of the second charging module 112.

In embodiments of the present disclosure, if both the first charging module and the second charging module are configured for charging, the first charging module may send a synchronization signal to the second charging module through a synchronization signal input end. The synchronization signal may be configured to indicate power consumption of charging the battery by the second charging module. Here, the second charging module receives the synchronization signal based on the synchronization signal input end. Alternatively, if one of the first charging module and the second charging module is configured for charging, the first charging module does not need to send a synchronization signal to the second charging module.

Referring again to FIG. 4, in some embodiments, the switching circuit 12 is configured to, in response to normal charging with the first charging module 111, switch the controlled switch module 121 from the second switch state to the first switch state, causing the second charging module to enter the non-charging state.

In one or more embodiments, the controlled switch module being in the first switch state includes at least one of the follows.

The first end and the third end of the first controlled switch may be connected.

The first end and the third end of the second controlled switch are connected, and the first end and the third end of the third controlled switch are connected.

The third end and the first end of the fourth controlled switch are connected, and the second end and the first end of the fifth controlled switch are connected.

In embodiments of the present disclosure, in case of normal charging with the first charging module, the first charging module may be considered to resume normal charging. In this case, with embodiments of the present disclosure, charging by the wireless charging device using the second charging module may be stopped, and charging may be performed again using the first charging module alone.

Referring again to FIG. 6A and FIG. 6B, in some embodiments, the control module 122 is configured to send a first control signal to the controlled switch module 121 in response to abnormal charging with the first charging module 111.

The controlled switch module 121 may connect a first end and a second end of at least one of the first controlled switch 1211, the second controlled switch 1212, the third controlled switch 1213, the fourth controlled switch 1214, and the fifth controlled switch 1215 based on the first control signal.

Alternatively, based on the first control signal, the controlled switch module 121 may connect a first end and a second end of at least one of the first controlled switch 1211, the second controlled switch 1212, the third controlled switch 1213, and the fifth controlled switch 1215, and connect a first end and a third end of the fourth controlled switch 1214.

For example, in one or more embodiments, the first control signal is a high level signal. The high level signal is configured to connect the first end and the second end of a controlled switch.

Here, the first controlled switch, the second controlled switch, the third controlled switch, the fourth controlled switch, and the fifth controlled switch each may include four ends.

For example, in one or more embodiments, the fourth end of the first controlled switch is connected to the control module, the fourth end of the second controlled switch is connected to the control module, the fourth end of the third controlled switch is connected to the control module, the fourth end of the fourth controlled switch is connected to the control module, and the fourth end of the fifth controlled switch is connected to the control module.

Figure 7A:
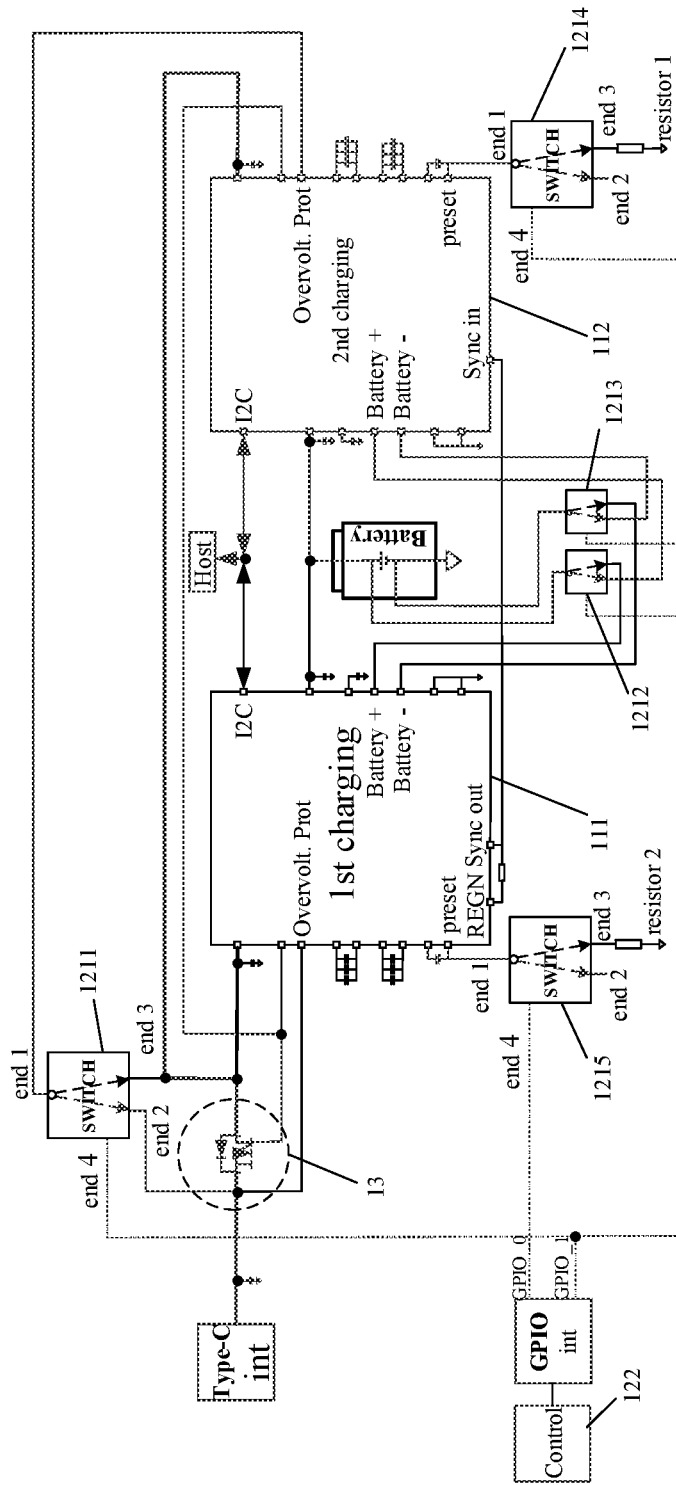
FIG. 7A is a block diagram of a charging device, according to an example of the present disclosure.
Figure 7B:
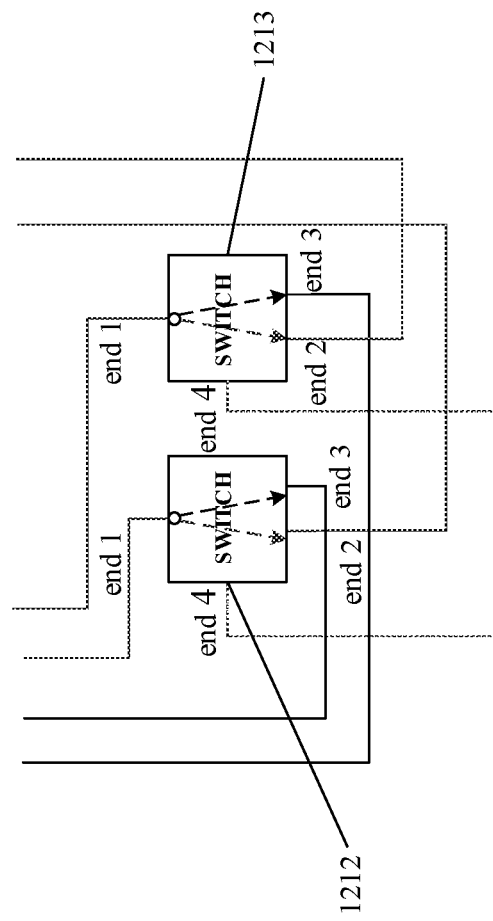
FIG. 7B is a partial view of a lower middle part of the charging device in FIG. 7A.

As another example, in another embodiment, as shown in FIG. 7A and FIG. 7B, the fourth end of the first controlled switch, the fourth end of the second controlled switch, the fourth end of the third controlled switch, the fourth end of the fourth controlled switch, and the fourth end of the fifth controlled switch are respectively configured to be connected to a general-purpose input/output (GPIO) interface of the charging device. A GPIO interface here is connected to the control module. Thus, in the present example, switch of ends of the first controlled switch, the second controlled switch, the third controlled switch, the fourth controlled switch, and the fifth controlled switch may be controlled through the control signal received through the GPIO interface.

A GPIO interface here may include a first pin and a second pin. In one or more embodiments, as shown in FIG. 5, the first controlled switch, the second controlled switch, the third controlled switch, and the fourth controlled switch are connected respectively to a first pin GPIO_0 of the GPIO interface. The fifth controlled switch may be connected to a second pin GPIO_1 of the GPIO interface. In this manner, the first controlled switch, the second controlled switch, the third controlled switch, and the fourth controlled switch may be controlled together, and the fifth controlled switch may be controlled separately.

In embodiments of the present disclosure, in case of abnormal charging with the first charging module, the second end and the first end of the first controlled switch may be connected via the first control signal sent by the control module, so that the second charging module is connected to the input end of the overvoltage protection circuit to perform charging with the second charging module. Alternatively, the first end and the second end of each of the second controlled switch and the third controlled switch may be connected, so that the second charging module detects the charging voltage of the battery. Alternatively, the first end and the second end of each of the third controlled switch and the fourth controlled switch may be connected, implementing peripheral configuration of charging with the second charging module. In this way, charging may be continued by replacing the first charging module with the second charging module, improving charging efficiency of the charging module, reducing charging time.

Figure 8:
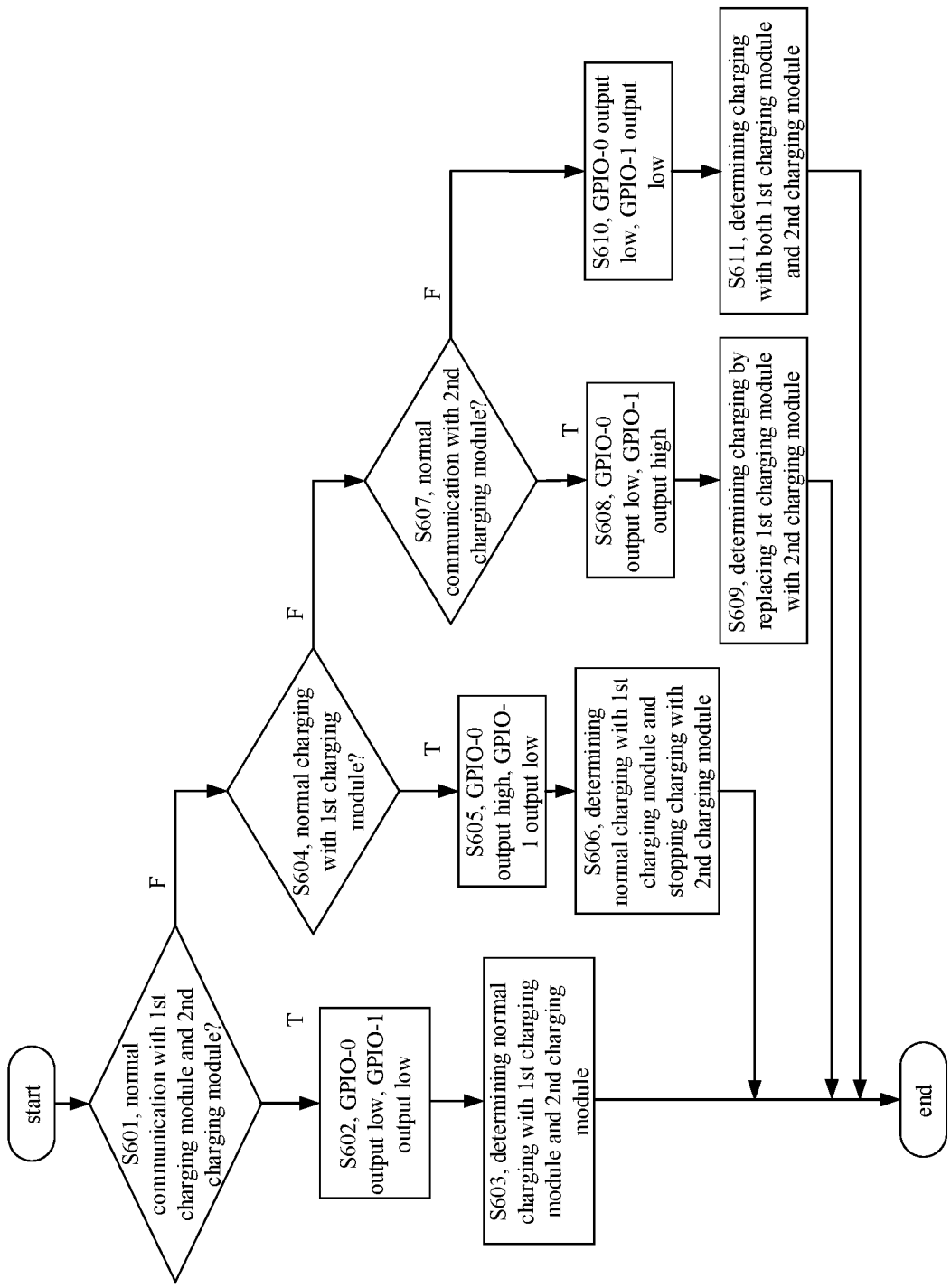
FIG. 8 is a diagram of logic control of a charging device, according to an example of the present disclosure.

For example, in an application scene, the first controlled switch, the second controlled switch, the third controlled switch, and the fourth controlled switch are connected respectively to the first pin GPIO_0 of the GPIO interface, and the fifth controlled switch is connected to the second pin GPIO_1 of the GPIO interface. In this application scene, a specific control logic of a charging device is disclosed. As shown in FIG. 8, steps of the control logic are as follows.

In S601, it may be determined whether communication with the first charging module and the second charging module is normal. If the communication is normal, S602 may be performed. If the communication is not normal, S604 may be performed.

In S602, the GPIO_0 may be set to output a low level, and the GPIO_1 may be set to output a low level.

A high level here may be configured to connect the first end and the third end of a controlled switch. A low level here may be configured to connect the first end and the second end of a controlled switch.

In an optional embodiment, the GPIO_0=0 and the GPIO_1=1.

In S603, it may be determined that the first charging module and the second charging module perform charging normally.

In S604, it may be determined whether normal charging with the first charging module occurs. If normal charging with the first charging module occurs, S605 may be performed. If abnormal charging with the first charging module occurs, S607 may be performed.

In S605, it may be set that the GPIO_0 outputs a high level, and the GPIO_1 outputs a low level.

In an optional embodiment, the GPIO_0=1 and the GPIO_1=0.

In S606, it may be determined that normal charging with the first charging module occurs and charging with the second charging module stops.

In S607, it may be determined whether communication with the second charging module is normal. If communication with the second charging module is normal, S608 may be executed. If communication with the second charging module is abnormal, S610 may be performed.

In S608, it may be set that the GPIO_0 outputs a low level, and the GPIO_1 outputs a high level.

In an optional embodiment, the GPIO_0=0 and the GPIO_1=1.

In S609, it may be determined that the second charging module replaces the first charging module to perform charging.

In S610, it may be set that the GPIO_0 outputs a low level, and the GPIO_1 outputs a low level.

In an optional embodiment, the GPIO_0=0 and the GPIO_1=0.

In S611, it may be determined that charging is performed using both the first charging module and the second charging module.

In this way, in the present example, it is possible to switch a controlled switch between ends by setting that the first GPIO pin and the second GPIO pin output different levels, thereby controlling the charging device to be in different charging states.

In some embodiments, the control module 122 may be configured to send a second control signal to the controlled switch module 121 in response to normal charging with the first charging module 111.

Based on the second control signal, the controlled switch module 121 may connect a third end and a first end of each of the first controlled switch 1211, the second controlled switch 1212, and the third controlled switch 1213, and connect a second end and a first end of each of the fourth controlled switch 1214 and the fifth controlled switch 1215.

Alternatively, based on the second control signal, the controlled switch module 121 may connect the first end and the third end of at least one of the first controlled switch 1211, the second controlled switch 1212, the third controlled switch 1213, and the fifth controlled switch 1215, and connect the first end and the second end of the fourth controlled switch 1214.

In one or more embodiments, the control module includes a first sub-control module and a second sub-control module. The first control signal may include a high level signal and a low level signal. The first sub-control module may be connected respectively to the first controlled switch, the second controlled switch, and the third controlled switch, for transmitting a low level signal to the first controlled switch, the second controlled switch, and the third controlled switch. The second sub-control module may be connected respectively to the fourth controlled switch and the fifth controlled switch, for transmitting a high level signal to the fourth controlled switch and the fifth controlled switch.

The high level signal here may be configured to connect the first end and the third end of a controlled switch, and the low level signal here may be configured to connect the first end and the second end of a controlled switch.

In embodiments of the present disclosure, in case of normal charging with the first charging module, the first end and the third end of each of the first controlled switch, the second controlled switch, and the third controlled switch may be connected. When a loss or communication abnormality occurs to the second charging module, charging may still be performed via the first charging module, thereby substantially maintaining charging efficiency of the charging device. Further, the second end and the first end of each of the fourth controlled switch and the fifth controlled switch may be connected, indicating that the charging device performs charging with a single charging module.

In other embodiments, the control module is further configured to transmit a third control signal to the controlled switch module in case of normal charging with the first charging module and it is determined that the second charging module operates normally.

The controlled switch module may connect the first end and the third end of each of the first controlled switch, the second controlled switch, the third controlled switch, the fourth controlled switch, and the fifth controlled switch based on the third control signal.

In one or more embodiments, the third control signal is a low level signal.

In embodiments of the present disclosure, the first charging module and the second charging module operate in parallel for charging, thereby improving charging efficiency of the charging module greatly, reducing charging time.

An example of a specific charging device is provided below with reference to any charging device embodiment described above. Referring again to FIG. 7A and FIG. 7B, the charging device may include a charging circuit, a switching circuit, and an overvoltage protection circuit 13.

The charging circuit 11 includes a first charging module 111 and a second charging module 112.

The switching circuit 12 may include:
a controlled switch module 121 including a first controlled switch 1211, a second controlled switch 1212, a third controlled switch 1213, a fourth controlled switch 1214, and a fifth controlled switch 1215; and
a control module 122 connected to the fifth controlled switch 1215 through a first pin (GPIO_0) of the GPIO, and connected respectively to a first controlled switch 1211, a second controlled switch 1212, a third controlled switch 1213, and a fourth controlled switch 1214 through a second pin (GPIO_1) of the GPIO.

The overvoltage protection end of the first charging module 111 may be connected to the input end of the overvoltage protection circuit 13.

The first end of the first controlled switch 1211 may be connected to the overvoltage protection end of the second charging module 1212. The second end of the first controlled switch 1211 may be connected to the input end of the overvoltage protection circuit 13. The third end of the first controlled switch 1211 may be connected to the output end of the overvoltage protection circuit 13.

The first end of the second controlled switch 1212 may be configured to be connected to the positive pole of a battery. The second end of the second controlled switch 1212 may be connected to the battery positive pole end of the second charging module 112. The third end of the second controlled switch 132 may be connected to the battery positive pole end of the first charging module 111.

The first end of the third controlled switch 1213 may be configured to be connected to the negative pole of the battery. The second end of the third controlled switch 1213 may be configured to be connected to the battery negative pole end of the second charging module 112. The third end of the third controlled switch 1213 may be configured to be connected to the battery negative pole end of the first charging module 111.

The first end of the fourth controlled switch 1214 may be connected to the second charging module 112. The second end of the fourth controlled switch 1214 may suspend. The third end of the fourth controlled switch 1214 may be configured to be connected to the first resistor.

The first end of the fifth controlled switch 1215 may be connected to the first charging module 111. The second end of the fifth controlled switch 1215 may suspend. The third end of the fifth controlled switch 135 may be configured to be connected to the second resistor.

The control module 122 may be configured, in case of abnormal charging with the first charging module 111, to transmit a first control signal to the controlled switch module 121, to connect the first end and the second end of each of the first controlled switch 1211, the second controlled switch 1212, the third controlled switch 1213, the fourth controlled switch 1214, and the fifth controlled switch 1215.

The control module 122 may be configured, in case of normal charging with the first charging module 111, to transmit a second control signal to the controlled switch module 121, to connect the first end and the third end of each of the first controlled switch 1211, the second controlled switch 1212, and the third controlled switch 1213, and connect the first end and the second end of each of the fourth controlled switch 1214 and the fifth controlled switch 1215.

In this way, in embodiments of the present disclosure, without changing the original charging architecture of the charging device, five controlled switches, a control module for switching and connecting ends of the five controlled switches, etc., are added, such that it is possible to freely switch to charging according to any one of the first charging module and the second charging module. That is, when any one of the first charging module and the second charging module is damaged and thus cannot perform charging, charging may be continued according to the remaining one, so that charging efficiency of the charging device may be substantially maintained, reducing probability of significant decrease in charging performance of the charging device. Moreover, the charging device provided in embodiments of the present disclosure has little change in structure, with compatibility to a PCB of hardware design.

For example, a 4500 mAn battery of smart equipment may be charged fully in about 45 minutes when both the first charging module and the second charging module are used for charging. It may take about 56 minutes for the battery to be charged fully when a single charging module is used for charging, that is, when one of the first charging module and the second charging module performs charging. In related art, it may take about 110 minutes for the battery to be charged fully if charging is performed directly according to the PMIC charging chip when abnormal charging with the first charging module occurs. It will be appreciated that in embodiments of the present disclosure, in case of abnormal charging with the first charging module, charging according to the second charging module does not significantly decrease charging efficiency, while in case of abnormal charging with the first charging module in related art, charging according to the PMIC charging chip significantly decreases charging efficiency.

Note that the following description of a charging method corresponds to description of a charging device herein. Refer to description of a charging device embodiment of the present disclosure for technical details not disclosed in a charging method embodiment of the present disclosure, which is not repeated here.

Figure 9:
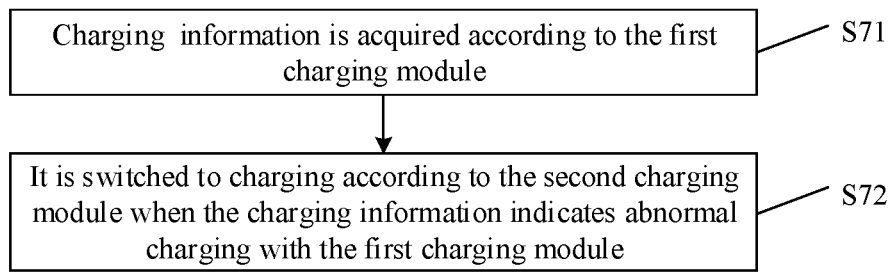
FIG. 9 is a flowchart of a charging method, according to an example of the present disclosure.

As shown in FIG. 9, there is provided a charging method, applied to a charging device. The charging device includes a charging circuit. The charging circuit includes N charging modules. The N charging modules include at least a first charging module and a second charging module. The N is an integer greater than 1. The method includes steps as follows.

In S71, charging information is acquired according to the first charging module.

In S72, it is switched to charging according to the second charging module when the charging information indicates abnormal charging with the first charging module.

In S72, it may be switched to charging using the second charging module.

Here, if the charging information indicates abnormal charging with the first charging module, the first charging module is controlled to stop performing charging and the second charging module is controlled to perform charging.

The charging information here may indicate normal charging with the first charging module, and that charging is performed according to the first charging module, or charging is performed according to both the second charging module and the first charging module.

Here, the first charging module may be the master charging module, and the second charging module may be the slave charging module.

In some embodiments, S72 may be implemented as follows.

A first control signal may be generated when the charging information indicates abnormal charging with the first charging module.

Charging may be performed with the second charging module based on the first control signal.

In some embodiments, the charging device includes an overvoltage protection circuit.

Charging may be performed with the second charging module based on the first control signal, as follows.

It may be switched based on the first control signal to connect the second charging module to an input end of the overvoltage protection circuit, causing the second charging module to enter a charging state to perform charging 1.

In other embodiments, charging may be performed with the second charging module based on the first control signal, according to at least one of the following.

Based on the first control signal, the battery positive pole end of the second charging module may be controlled for being connected to the positive pole of a battery in the wireless charging device, and the battery negative pole end of the second charging module may be controlled for being connected to the negative pole of the battery, causing the second charging module to enter the charging state to perform charging.

Based on the first control signal, a predetermined end of the second charging module may be controlled to suspend, and a predetermined end of the first charging module may be controlled to suspend, causing the second charging module to enter the charging state to perform charging.

Based on the first control signal, a predetermined end of the second charging module may be controlled to be connected to a resistor, and a predetermined end of the first charging module may be controlled to suspend, causing the second charging module to enter the charging state to perform charging.

In one or more embodiments, a resistor connected to a predetermined end of the second charging module may be a first resistor.

When the second charging module is connected to the input end of the overvoltage protection circuit, the second charging module may enter the charging state.

In some embodiments, the method further includes an option as follows.

It may be switched back to charging according to the first charging module when charging indication information indicates normal charging with the first charging module.

In some embodiments, the method further includes an option as follows.

A second control signal may be generated when the charging information indicates normal charging with the first charging module.

Charging with the second charging module may be stopped based on the second control signal.

In some embodiments, charging with the second charging module may be stopped based on the second control signal as follows.

Based on the second control signal, the second charging module may be switched to be connected to an output end of the overvoltage protection circuit, causing the second charging module to enter a non-charging state to stop charging.

When the second charging module is connected to the output end of the overvoltage circuit, the second charging module enters the non-charging state.

In some other embodiments, charging may be performed with the second charging module based on the first control signal, according to at least one of the following.

Based on the first control signal, the battery positive pole end of the first charging module may be controlled for being connected to the positive pole of a battery in the wireless charging device, and the battery negative pole end of the first charging module may be controlled for being connected to the negative pole of the battery, causing the second charging module to enter the charging state to perform charging.

Based on the first control signal, a predetermined end of the second charging module may be controlled to suspend, and a predetermined end of the first charging module may be controlled to be connected to a resistor, causing the second charging module to enter the charging state to perform charging.

In one or more embodiments, the resistor connected to the predetermined end of the first charging module may be a second resistor.

In some embodiments, S71 may be implemented as follows.

A first control signal may be generated when abnormal charging with the first charging module occurs.

Based on the first control signal, the second charging module may be switched to be connected to the input end of the overvoltage protection circuit.

In some embodiments, the method further includes an option as follows. The charging voltage with which the second charging module performs charging may be detected. In this way, in embodiments of the present disclosure, the charging voltage with the second charging module may also be monitored in real time, to learn about how the wireless charging device performs charging according to the second charging module.

In some embodiments, if normal charging with the first charging module occurs, the second charging module may be switched to be connected to the output end of the overvoltage protection circuit, as follows.

A second control signal may be generated if the first charging module performs charging normally.

The second charging module may be switched to be connected to the output end of the overvoltage protection circuit based on the second control signal.

Embodiments of the present disclosure further provide a terminal.

The terminal includes a processor and a memory for storing processor-executable instructions.

The processor is configured to implement the charging method described in any embodiment of the present disclosure when executing the executable instructions.

Here, the terminal is a terminal including a charging device.

The memory may include various types of storage media. The storage media are non-transitory computer storage media, capable of continuing to memorize the information stored thereon after the communication equipment is powered down.

The processor may be connected to the memory via a bus, etc., for reading an executable program stored on the memory, such as to implement at least one method as shown in FIG. 8 to FIG. 9.

A module of a device according to an aforementioned embodiment herein may perform an operation in a mode elaborated in an aforementioned embodiment of the charging device herein, which will not be repeated here.

Figure 10:
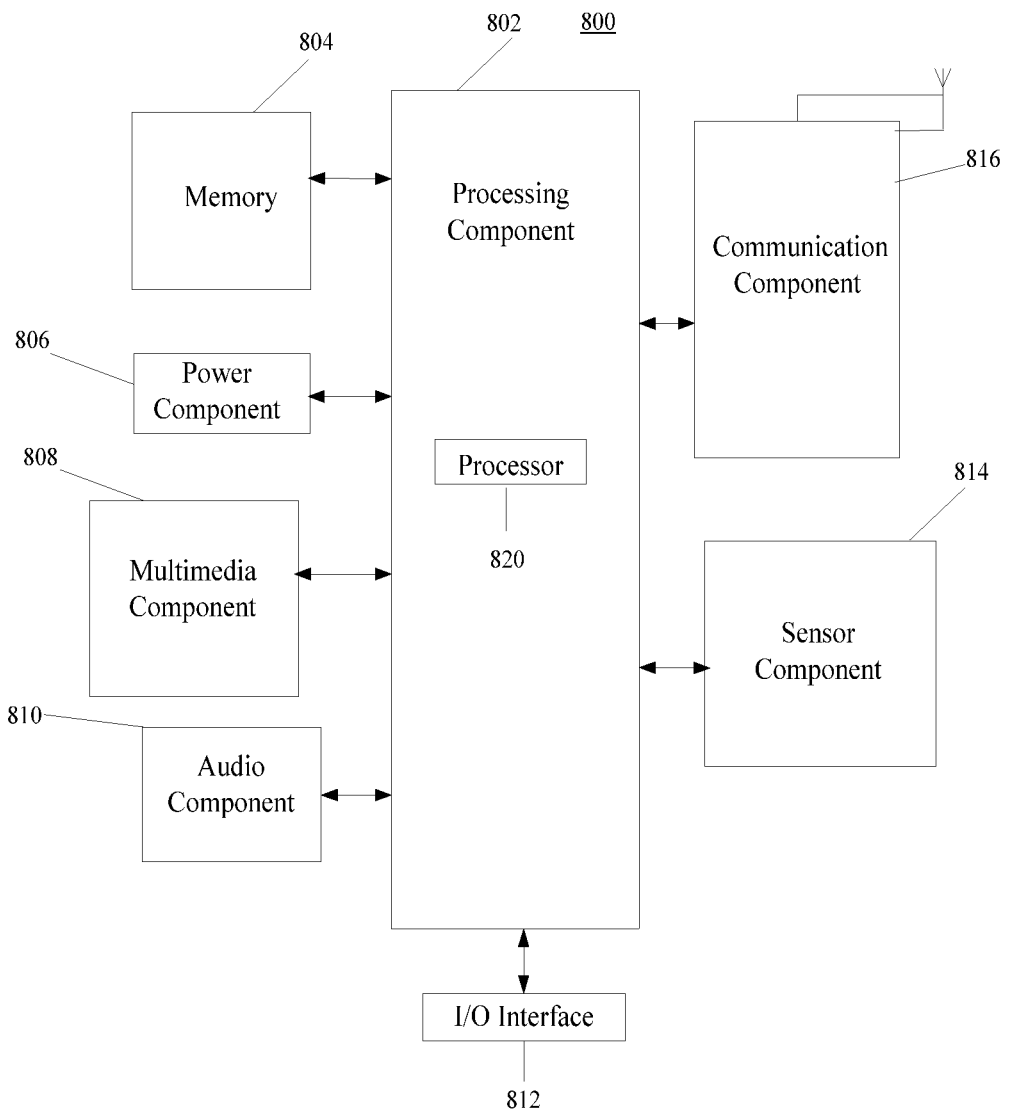
FIG. 10 is a block diagram of a charging device, according to an example of the present disclosure.

FIG. 10 is a block diagram of a charging device 800 according to an illustrative embodiment. For example, the device 800 may be a mobile phone, a computer, a digital broadcasting terminal, messaging equipment, a game console, tablet equipment, medical equipment, fitness equipment, a Personal Digital Assistant (PDA), etc.

As shown in FIG. 10, the device 800 may include one or more components as follows: a processing component 802, a memory 804, a power component 806, a multimedia component 808, an audio component 810, an Input/Output (I/O) interface 812, a sensor component 814, and a communication component 816.

The processing component 802 generally controls an overall operation of the display equipment, such as operations associated with display, a telephone call, data communication, a camera operation, a recording operation, etc. The processing component 802 may include one or more processors 820 to execute instructions so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation on the device 800. Examples of these data include instructions of any application or method configured to operate on the device 800, contact data, phonebook data, messages, images, videos, and/etc. The memory 804 may be implemented by any type of volatile or non-volatile storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 806 supplies electric power to various components of the device 800. The power component 806 may include a power management system, one or more power supplies, and other components related to generating, managing and distributing electric power for the device 800.

The multimedia component 808 includes a screen providing an output interface between the device 800 and a user. The screen may include a Liquid Crystal Display (LCD) and a Touch Panel (TP). If the screen includes a TP, the screen may be implemented as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some embodiments, the multimedia component 808 includes a front camera and/or a rear camera. When the device 800 is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 810 is configured to output and/or input an audio signal. For example, the audio component 810 includes a microphone (MIC). When the device 800 is in an operation mode such as a call mode, a recording mode, and a voice recognition mode, the MIC is configured to receive an external audio signal. The received audio signal may be further stored in the memory 804 or may be sent via the communication component 816. In some embodiments, the audio component 810 may further include a loudspeaker configured to output the audio signal.

The I/O interface 812 provides an interface between the processing component 802 and a peripheral interface module. The peripheral interface module may be a keypad, a click wheel, a button, etc. These buttons may include but are not limited to: a homepage button, a volume button, a start button, and a lock button.

The sensor component 814 includes one or more sensors for assessing various states of the device 800. For example, the sensor component 814 may detect an on/off state of the device 800 and relative location of components such as the display and the keypad of the device 800. The sensor component 814 may further detect a change in the location of the device 800 or of a component of the device 800, whether there is contact between the device 800 and a user, the orientation or acceleration/deceleration of the device 800, and a change in the temperature of the device 800. The sensor component 814 may include a proximity sensor configured to detect existence of a nearby object without physical contact. The sensor component 814 may further include an optical sensor such as a Complementary Metal-Oxide-Semiconductor (CMOS) or Charge-Coupled-Device (CCD) image sensor used in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless/radio communication between the device 800 and other equipment. The device 800 may access a radio network based on a communication standard such as WIFI, 2G, 3G, . . . , or a combination thereof. In an illustrative embodiment, the communication component 816 broadcasts related information or receives a broadcast signal from an external broadcast management system via a broadcast channel. In an illustrative embodiment, the communication component 816 may further include a Near Field Communication (NFC) module for short-range communication. For example, the NFC module may be implemented based on Radio Frequency Identification (RFID), Infrared Data Association (IrDA), Ultra-WideBand (UWB) technology, BLUETOOTH (BT) technology, and other technologies.

In an illustrative embodiment, the device 800 may be implemented by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method.

In an illustrative embodiment, a non-transitory computer-readable storage medium including instructions, such as the memory 804 including instructions, is further provided. The instructions may be executed by the processor 820 of the device 800 to implement a step of the charging method of an embodiment herein. For example, the non-transitory computer-readable storage medium may be a Read-Only Memory (ROM), a Random Access Memory (RAM), a Compact Disc Read-Only Memory (CD-ROM), a magnetic tape, a floppy disk, optical data storage equipment, etc.

Embodiments of the present disclosure further disclose a computer-readable storage medium having stored therein an executable program which, when executed by a processor, implements the charging method according to any embodiment herein.

According to a first aspect of embodiments of the present disclosure, there is provided a charging device, including:
  a charging circuit including N charging modules, the N charging modules including at least a first charging module and a second charging module, the N being an integer greater than 1; and
  a switching circuit connecting the first charging module and the second charging module.

The switching circuit is configured to, in response to normal charging with the first charging module, control the first charging module to enter a charging state or control both the second charging module and the first charging module to enter the charging state; or, in response to abnormal charging with the first charging module, control the second charging module to enter the charging state.

In the above embodiment, the switching circuit includes:
  a controlled switch module connecting the first charging module and the second charging module; and
  a control module, connected to the controlled switch module, and configured to, in response to abnormal charging with the first charging module, switch the controlled switch module from a first switch state to a second switch state, causing the second charging module to enter the charging state.

If the controlled switch module is in the first switch state and normal charging with the first charging module occurs, the second charging module enters a non-charging state.

In the above embodiment, the charging device further includes an overvoltage protection circuit.

The controlled switch module may include at least a first controlled switch.

An overvoltage protection end of the first charging module may be connected to an input end of the overvoltage protection circuit.

An overvoltage protection end of the second charging module may be connected to a first end of the first controlled switch. A second end of the first controlled switch may be connected to an input end of the overvoltage protection circuit. A third end of the first controlled switch may be connected to an output end of the overvoltage protection circuit.

In case of abnormal charging with the first charging module, the second end and the first end of the first controlled switch may be connected, and the second charging module may enter the charging state.

In the above embodiment, in case of normal charging with the first charging module, the first end and the third end of the first controlled switch are connected, and the first charging module enters the non-charging state.

In the above embodiment, the controlled switch module further includes a second controlled switch and a third controlled switch.

A first end of the second controlled switch may be configured to be connected to a positive pole of a battery. A second end of the second controlled switch may be configured to be connected to a battery positive pole end of the second charging module. A third end of the second controlled switch may be connected to a battery positive pole end of the first charging module.

A first end of the third controlled switch may be configured to be connected to a negative pole of the battery. A second end of the third controlled switch may be configured to be connected to a battery negative pole end of the second charging module. A third end of the third controlled switch may be connected to a battery negative pole end of the first charging module.

In case of abnormal charging with the first charging module, the second end and the first end of the second controlled switch may be connected, the second end and the first end of the third controlled switch may be connected, and the second charging module may detect a charging voltage of the battery.

In the above embodiment, the controlled switch module further includes a fourth controlled switch and a fifth controlled switch.

A first end of the fourth controlled switch may be connected to the second charging module. A second end of the fourth controlled switch may suspend. A third end of the fourth controlled switch may be configured to be connected to a first resistor.

A first end of the fifth controlled switch may be connected to the first charging module. A second end of the fifth controlled switch may suspend.

In case of abnormal charging with the first charging module, the second end and the first end of the fourth controlled switch may be connected, and the second end and the first end of the fifth controlled switch may be connected; or the third end and the first end of the fourth controlled switch may be connected, and the second end and the first end of the fifth controlled switch may be connected.

In the above embodiment, the control module is configured to send a first control signal to the controlled switch module in response to abnormal charging with the first charging module.

The controlled switch module may connect a first end and a second end of at least one of the first controlled switch, the second controlled switch, the third controlled switch, the fourth controlled switch, and the fifth controlled switch based on the first control signal.

In the above embodiment, the control module is configured to send a second control signal to the controlled switch module in response to normal charging with the first charging module.

Based on the second control signal, the controlled switch module may connect a third end and a first end of each of the first controlled switch, the second controlled switch, and the third controlled switch, and connect a second end and a first end of each of the fourth controlled switch and the fifth controlled switch.

In the above embodiment, the switching circuit is configured to, in response to normal charging with the first charging module, switch the controlled switch module from the second switch state to the first switch state, causing the second charging module to enter the non-charging state.

According to a second aspect of embodiments of the present disclosure, there is provided a charging method. The charging method is applied to a charging device including a charging circuit. The charging circuit includes N charging modules. The N charging modules include at least a first charging module and a second charging module. The N is an integer greater than 1. The method includes:
  acquiring charging information according to the first charging module; and
  switching to charging according to the second charging module in response to the charging information indicating abnormal charging with the first charging module.

In the above embodiment, switching to charging according to the second charging module in response to the charging information indicating abnormal charging with the first charging module includes:
  generating a first control signal in response to the charging information indicating abnormal charging with the first charging module; and
  performing charging with the second charging module based on the first control signal.

In the above embodiment, the charging device includes an overvoltage protection circuit.

Performing charging with the second charging module based on the first control signal may include:
  if abnormal charging with the first charging module occurs, switching the second charging module to be connected to an input end of the overvoltage protection circuit, causing the second charging module to enter a charging state to perform charging.

In the above embodiment, the charging method further includes:
  generating a second control signal in response to the charging information indicating normal charging with the first charging module; and
  stopping charging with the second charging module based on the second control signal.

In the above embodiment, stopping charging with the second charging module based on the second control signal includes:
  switching, based on the second control signal, the second charging module to be connected to an output end of the overvoltage protection circuit, causing the second charging module to enter a non-charging state to stop charging.

According to a third aspect of embodiments of the present disclosure, there is provided a terminal, including a processor and a memory for storing processor executable instructions.

The processor is configured to, when executing the executable instructions, implement the charging method according to any embodiment of the present disclosure.

According to a fourth aspect of embodiments of the present disclosure, there is provided a non-transitory computer-readable storage medium having stored therein an executable program which, when executed by a processor, implements the charging method according to any embodiment of the present disclosure.

Further note that although in drawings herein operations are described in a specific or der, it should not be construed as that the operations have to be performed in the specific or der or sequence, or that any operation shown has to be performed in or der to acquire an expected result. Under a specific circumstance, multitask and parallel processing may be advantageous.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the embodiments are intended to be illustrative only, with a true scope and spirit of the present disclosure being indicated by the appended claims.

It should be understood that the present disclosure is not limited to the exact construction that has been described above and illustrated in the accompanying drawings, and that various modifications and changes may be made to the present disclosure without departing from the scope of the present disclosure. It is intended that the scope of the present disclosure is limited only by the appended claims.

What is claimed is:

1. A charging device, comprising:
a charging circuit that comprises at least a first charging module and a second charging module; and
a switching circuit connecting the first charging module and the second charging module,
wherein the switching circuit is configured to perform at least one of:
control, in response to normal charging with the first charging module, the first charging module to enter a charging state;
control both the second charging module and the first charging module to enter the charging state; or
control, in response to abnormal charging with the first charging module, the second charging module to enter the charging state,
wherein the switching circuit comprises:
a controlled switch module connecting the first charging module and the second charging module; and
a control module, connected to the controlled switch module and configured to switch, in response to abnormal charging with the first charging module, the controlled switch module from a first switch state to a second switch state, causing the second charging module to enter the charging state,
wherein the second charging module enters a non-charging state in response to the controlled switch module being in the first switch state as well as normal charging with the first charging module.

2. The charging device of claim 1, further comprising an overvoltage protection circuit,
wherein the controlled switch module comprises at least a first controlled switch,
wherein an overvoltage protection end of the first charging module is connected to an input end of the overvoltage protection circuit,
wherein an overvoltage protection end of the second charging module is connected to a first end of the first controlled switch, a second end of the first controlled switch is connected to the input end of the overvoltage protection circuit, and a third end of the first controlled switch is connected to an output end of the overvoltage protection circuit, and
wherein, in response to abnormal charging with the first charging module, the second charging module enters the charging state, and the second end and the first end of the first controlled switch are connected.

3. The charging device of claim 1, wherein the controlled switch module further comprises a second controlled switch and a third controlled switch,
wherein a first end of the second controlled switch is configured to be connected to a positive pole of a battery, a second end of the second controlled switch is configured to be connected to a battery positive pole end of the second charging module, and a third end of the second controlled switch is configured to be connected to a battery positive pole end of the first charging module,
wherein a first end of the third controlled switch is configured to be connected to a negative pole of the battery, a second end of the third controlled switch is configured to be connected to a battery negative pole end of the second charging module, and a third end of the third controlled switch is configured to be connected to a battery negative pole end of the first charging module, and
wherein, in response to abnormal charging with the first charging module, the second end and the first end of the second controlled switch are connected, the second end and the first end of the third controlled switch are connected, and the second charging module detects a charging voltage of the battery.

4. The charging device of claim 1, wherein the controlled switch module further comprises a fourth controlled switch and a fifth controlled switch,
wherein a first end of the fourth controlled switch is connected to the second charging module, a second end of the fourth controlled switch suspends, and a third end of the fourth controlled switch is configured to be connected to a first resistor,
wherein a first end of the fifth controlled switch is connected to the first charging module, and a second end of the fifth controlled switch suspends, and
wherein, in response to abnormal charging with the first charging module;
the second end and the first end of the fourth controlled switch are connected, and the second end and the first end of the fifth controlled switch are connected; or
the third end and the first end of the fourth controlled switch are connected, and the second end and the first end of the fifth controlled switch are connected.

5. The charging device of claim 2, wherein the controlled switch module further comprises a second controlled switch and a third controlled switch,
wherein a first end of the second controlled switch is configured to be connected to a positive pole of a battery, a second end of the second controlled switch is configured to be connected to a battery positive pole end of the second charging module, and a third end of the second controlled switch is configured to be connected to a battery positive pole end of the first charging module,
wherein a first end of the third controlled switch is configured to be connected to a negative pole of the battery, a second end of the third controlled switch is configured to be connected to a battery negative pole end of the second charging module, and a third end of the third controlled switch is configured to be connected to a battery negative pole end of the first charging module, and
wherein, in response to abnormal charging with the first charging module, the second end and the first end of the second controlled switch are connected, the second end and the first end of the third controlled switch are connected, and the second charging module detects a charging voltage of the battery.

6. The charging device of claim 2, wherein the controlled switch module further comprises a fourth controlled switch and a fifth controlled switch,
wherein a first end of the fourth controlled switch is connected to the second charging module, a second end of the fourth controlled switch suspends, and a third end of the fourth controlled switch is configured to be connected to a first resistor, wherein a first end of the fifth controlled switch is connected to the first charging module, and a second end of the fifth controlled switch suspends, and wherein, in response to abnormal charging with the first charging module, the second end and the first end of the fourth controlled switch are connected and the second end and the first end of the fifth controlled switch are connected; or the third end and the first end of the fourth controlled switch are connected and the second end and the first end of the fifth controlled switch are connected.

7. The charging device of claim 4, wherein the control module is configured to send a first control signal to the controlled switch module in response to abnormal charging with the first charging module, and wherein the controlled switch module is configured to, based on the first control signal, connect a first end and a second end of at least one of the first controlled switch, the second controlled switch, the third controlled switch, the fourth controlled switch, and the fifth controlled switch.

8. The charging device of claim 7, wherein the control module is configured to send a second control signal to the controlled switch module in response to normal charging with the first charging module, and wherein, based on the second control signal, the controlled switch module is configured to:
connect a third end and a first end of each of the first controlled switch, the second controlled switch, and the third controlled switch; and
connect a second end and a first end of each of the fourth controlled switch and the fifth controlled switch.

9. The charging device of claim 1, wherein in response to normal charging with the first charging module, the switching circuit is configured to:
switch the controlled switch module from the second switch state to the first switch state; and
cause the second charging module to enter the non-charging state.

10. A charging method applied to a charging device, comprising:
acquiring charging information according to a first charging module, wherein the charging device comprises a charging circuit, wherein the charging circuit comprises at least the first charging module and a second charging module; and
switching to charging according to the second charging module in response to the charging information indicating abnormal charging with the first charging module, comprising:
generating a first control signal in response to the charging information indicating abnormal charging with the first charging module; and
performing charging with the second charging module based on the first control signal, wherein the charging device further comprises an overvoltage protection circuit, and performing charging with the second charging module based on the first control signal comprises:
switching, based on the first control signal, the second charging module to be connected to an input end of the overvoltage protection circuit; and
causing the second charging module to enter a charging state to perform charging.

11. The charging method of claim 10, further comprising:
generating a second control signal in response to the charging information indicating normal charging with the first charging module; and
stopping charging with the second charging module based on the second control signal.

12. The charging method of claim 11, wherein stopping charging with the second charging module based on the second control signal comprises:
switching, based on the second control signal, the second charging module to be connected to an output end of the overvoltage protection circuit; and
causing the second charging module to enter a non-charging state to stop charging.

13. A device, comprising:
one or more processors; and
a non-transitory computer-readable storage medium storing instructions executable by the one or more processors,
wherein the one or more processors are configured to:
acquire charging information according to a first charging module, wherein a charging device comprises a charging circuit, the charging circuit comprises at least the first charging module and a second charging module; and
switch to charging according to the second charging module in response to the charging information indicating abnormal charging with the first charging module, wherein switching to charging according to the second charging module comprises:
generating a first control signal in response to the charging information indicating abnormal charging with the first charging module; and
performing charging with the second charging module based on the first control signal, wherein the charging device further comprises an overvoltage protection circuit, and wherein perform charging with the second charging module comprises:
switching, based on the first control signal, the second charging module to be connected to an input end of the overvoltage protection circuit, causing the second charging module to enter a charging state to perform charging.

14. The device of claim 13, wherein the one or more processors are further configured to:
generate a second control signal in response to the charging information indicating normal charging with the first charging module; and
stop charging with the second charging module based on the second control signal.

15. The device of claim 14, wherein the one or more processors configured to stop charging with the second charging module based on the second control signal are further configured to:
switch, based on the second control signal, the second charging module to be connected to an output end of the overvoltage protection circuit; and
cause the second charging module to enter a non-charging state to stop charging.

* * * * *